US011092134B2

(12) United States Patent
Gudewer et al.

(10) Patent No.: US 11,092,134 B2
(45) Date of Patent: Aug. 17, 2021

(54) ADJUSTMENT UNIT FOR AZIMUTH ADJUSTMENT AND/OR PITCH ADJUSTMENT OF A WIND TURBINE, AND METHOD

(71) Applicant: Wobben Properties GmbH, Aurich (DE)

(72) Inventors: Wilko Gudewer, Norden (DE); Torsten Jepsen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 84 days.

(21) Appl. No.: 16/489,675

(22) PCT Filed: Feb. 26, 2018

(86) PCT No.: PCT/EP2018/054641
§ 371 (c)(1),
(2) Date: Aug. 28, 2019

(87) PCT Pub. No.: WO2018/158180
PCT Pub. Date: Sep. 7, 2018

(65) Prior Publication Data
US 2020/0116125 A1 Apr. 16, 2020

(30) Foreign Application Priority Data

Mar. 3, 2017 (DE) ............ 10 2017 104 474.4

(51) Int. Cl.
*F03D 7/02* (2006.01)
*F03D 80/70* (2016.01)
(Continued)

(52) U.S. Cl.
CPC .......... *F03D 7/0224* (2013.01); *F03D 80/70* (2016.05); *F03D 1/0658* (2013.01);
(Continued)

(58) Field of Classification Search
CPC ...... F03D 7/0224; F03D 7/0248; F03D 80/50; F03D 80/70; F03D 1/0658; F05B 2260/79;
(Continued)

(56) References Cited

U.S. PATENT DOCUMENTS 6,799,947 B2 10/2004 Wobben
7,137,785 B2 11/2006 Van Egeren et al.
(Continued)

FOREIGN PATENT DOCUMENTS

DE 10226713 A1 1/2004
DE 102007008167 A1 8/2008
(Continued)

*Primary Examiner* — Justin D Seabe
*Assistant Examiner* — Ryan C Clark
(74) *Attorney, Agent, or Firm* — Seed Intellectual Property Law Group LLP

(57) ABSTRACT

A adjustment unit for an azimuth adjustment and/or for a pitch adjustment of a wind turbine, to an adjustment apparatus, to a pitch adjustment apparatus, to an azimuth adjustment apparatus, to a wind turbine, and to methods for the rotor blade adjustment and wind direction tracking, and to the use of an adjustment unit and/or adjustment apparatus. The adjustment unit for an azimuth adjustment and/or for a pitch adjustment of a wind turbine comprises a drive unit which can be arranged on a first annular flange and has an eccentric shaft, a first engagement element which can be arranged on a circumference of a second annular flange which is arranged such that it can be rotated with respect to the first annular flange, a multiplicity of concavely and convexly configured first cam sections being arranged on a circumferential face of the first engagement element, and a second engagement element, with concave and convex second cam sections which are arranged on a circumferential face and correspond to the first cam sections.

19 Claims, 10 Drawing Sheets

(51) Int. Cl.
*F03D 80/50* (2016.01)
*F03D 1/06* (2006.01)

(52) U.S. Cl.
CPC ............ *F03D 7/0204* (2013.01); *F03D 80/50* (2016.05); *F05B 2260/79* (2013.01); *F16C 2360/31* (2013.01)

(58) Field of Classification Search
CPC ........ F05B 2260/403; F05B 2260/4031; F05B 2260/503; F05B 2260/506; F05B 2260/74; F05B 2260/76; F16C 2360/31
See application file for complete search history.

(56) References Cited

U.S. PATENT DOCUMENTS

| | | | |
|---|---|---|---|
| 7,780,417 | B2 | 8/2010 | Kirchner et al. |
| 9,726,152 | B2 | 8/2017 | Nohara |
| 9,790,920 | B2 * | 10/2017 | Nohara ............ F03D 15/00 |
| 2007/0231137 | A1 * | 10/2007 | Nitzpon ............... F03D 7/0224 416/43 |
| 2015/0377218 | A1 | 12/2015 | Trede et al. |
| 2015/0377219 | A1 * | 12/2015 | Nohara ................ F16H 25/02 416/170 R |
| 2016/0131106 | A1 | 5/2016 | Janßen et al. |

FOREIGN PATENT DOCUMENTS

| | | | | |
|---|---|---|---|---|
| DE | 102007009575 | A1 | | 8/2008 |
| DE | 102014009306 | A1 | | 12/2015 |
| EP | 2960495 | A1 | | 12/2015 |
| JP | 2000110901 | A | | 4/2000 |
| JP | 2003527535 | A | | 9/2003 |
| JP | 2005069073 | A | | 3/2005 |
| JP | 2010048244 | A | * | 3/2010 ........... F03D 7/0204 |
| JP | 2012025003 | A | | 2/2012 |
| JP | 2013108538 | A | | 6/2013 |
| JP | 2016011590 | A | | 1/2016 |
| PL | 203086 | B1 | | 8/2009 |
| RU | 2530194 | C2 | | 10/2014 |
| WO | 2010/079375 | A1 | | 7/2010 |

* cited by examiner

ADJUSTMENT UNIT FOR AZIMUTH ADJUSTMENT AND/OR PITCH ADJUSTMENT OF A WIND TURBINE, AND METHOD

BACKGROUND

Technical Field

The invention relates to an adjustment unit for an azimuth adjustment and/or for a pitch adjustment of a wind turbine, to an adjustment apparatus, to a pitch adjustment apparatus, to an azimuth adjustment apparatus, to a wind turbine, and to methods for the rotor blade adjustment and wind direction tracking, and to the use of an adjustment unit and/or an adjustment apparatus.

Description of the Related Art

Wind turbines are generally known. The prevailing design of wind turbines is currently the three-bladed horizontal axis wind turbine, in the case of which the rotor is situated on the windward side during operation and the motor casing of which is arranged on the tower, and the wind direction is tracked actively, in particular by way of an azimuth adjustment unit. Furthermore, it is customary that the rotor blades can be rotated about a longitudinal axis by means of a pitch adjustment unit. The use of gearwheel arrangements for rotational connections is also generally known in the case of wind turbines at the points, at which components are moved rotationally relative to one another, and, in particular, where a transmission ratio from a first rotating component to a second rotating component is to be realized.

Rotational connections of this type are present, in particular, in the azimuth adjustment unit and/or the pitch adjustment unit. Gearwheel arrangements of the type denoted above are subjected during operation to loads, inter alia by way of the drive which brings about the rotation by way of output-side forces and torques. For instance, the teeth which are in engagement with one another always also generate a frictional movement which is directed relative to one another in addition to a rolling movement. Wear arises at those points of the tooth flanks in the gearwheel arrangement which are loaded with friction. In order to limit the wear, the gearwheels of the gearwheel arrangement are therefore as a rule lubricated by way of the feed of lubricants. As a result, the wear can as a rule be reduced, but cannot be eliminated.

In particular in the case of the rotational connections which are known for wind turbines, in particular in the area of the pitch drive and/or the azimuth drive, the wear of the gearwheel arrangement does not as a rule occur uniformly. This is explained in the area of the azimuth drive, in particular, by the fact that the wind usually blows from a prevailing wind direction. The rotor of a wind turbine is therefore arranged for a particularly great proportion of time so as to face said prevailing wind direction. The rotor of a wind turbine is therefore as a rule and for a particularly great proportion of time adjusted merely in a small angular range, namely that of the prevailing wind direction. Therefore, one or more teeth are frequently in load-supporting engagement with an opposite gearwheel than a large part of the remaining teeth of the driving gearwheel. As a consequence, the wear is particularly great on teeth which are arranged in said region. The same wear symptoms can likewise be seen in the area of the pitch drive, since a rotor blade also as a rule has a certain preferred pitch adjustment range, in which it is set particularly frequently. The central tooth or teeth of the drive gearwheel of the pitch drive, which tooth or teeth is/are situated in engagement with the driven gearwheel, is/are also called the golden tooth or the golden teeth.

Furthermore, gearwheel arrangements of this type have the disadvantage that they can fail suddenly, for example, as a result of a tooth fracture. Moreover, gearwheel connections of this type frequently have very large overall sizes, since, for example, the transmission ratio to be achieved can be realized by way of a plurality of gear stages and large gearwheels to small gearwheels. Furthermore, the shock loading of a gearwheel connection of this type is restricted. Moreover, the play of the gearwheel connection has to be reduced as a rule by way of complicated measures, for example, by the gearwheel connection being prestressed. Gearwheel connections which are currently being used have an increased failure probability, which results in the fact that the wind turbine has a limited availability. This results, in particular, in the fact that the costs of the wind turbine are increased and/or the conversion to be achieved by way of a feed of energy is reduced. Furthermore, the large overall sizes of the spur gear toothing systems which are as a rule used result in further high costs.

The German Patent and Trade Mark Office has searched the following prior art in the priority application in respect of the present application: DE 102 26 713 A1, DE 10 2007 008 167 A1, DE 10 2007 009 575 A1, DE 10 2014 009 306 A1 and US 2016/0 131 106 A1.

BRIEF SUMMARY

Provided is an adjustment unit for an azimuth adjustment and/or for a pitch adjustment of a wind turbine, an adjustment apparatus, a pitch adjustment apparatus, an azimuth adjustment arrangement, a wind turbine and methods for the rotor blade adjustment and wind direction tracking, and the use of an adjustment unit and/or an adjustment apparatus, which may reduce or eliminate one or more of the above-mentioned disadvantages. Provided is a method of which makes a lower failure probability of a wind turbine possible.

According to a first aspect of the invention, provided is an adjustment unit for an azimuth adjustment and/or for a pitch adjustment of a wind turbine, comprising a drive unit which can be arranged on a first annular flange and has an eccentric shaft, a first engagement element which can be arranged on a circumference of a second annular flange which is arranged such that it can be rotated with respect to the first annular flange, a multiplicity of concavely and convexly configured first cam sections being arranged on a circumferential face of the first engagement element, a second engagement element, with concave and convex second cam sections which are arranged on a circumferential face and correspond to the first cam sections, and the eccentric shaft being arranged rotatably on the second engagement element, in particular at an eccentric point of the second engagement element, and the first engagement element and the second engagement element being arranged and configured to carry out rolling movements between the first cam sections and the second cam sections.

The concavely and convexly configured first and second cam sections can have a very wide variety of geometries. In particular, said cam sections are configured in such a way that the first and the second engagement element can roll on one another. The cam sections preferably have an undulating profile. As an alternative or in addition, the cam sections preferably have a tooth-shaped and/or sawtooth-shaped profile. In a further possible design variant, the cam elements have a trapezoidal tooth profile.

Furthermore, it is preferred that the first cam sections of the first engagement element and/or the second cam sections of the second engagement element have a cycloid toothing system. In particular, it is preferred that the first cam sections and/or the second cam sections have a cycloid toothing system, in which the individual flanks have an epicycloid geometry or an epicycloid above (that is to say, facing the flank tip) a rolling point and a hypocycloid geometry or a hypocycloid below (that is to say, facing away from the flank tip) the rolling point. In a further preferred design variant, it is provided that the first cam sections and/or the second cam sections have a curved epicycloid and/or a twisted hypocycloid. One advantage of a cycloid toothing system lies in the fact that satisfactory lubrication can be realized. Furthermore, the flank pressure is comparatively low, since a flank pair consists of a concave section and a convex section, with the result that a full surface area contact can be realized here. Moreover, a high overload capacity of up to 500% of the regular drive torque and smooth running are to be mentioned as advantageous effects.

Fundamentally, every geometry is possible for the cam sections which bring about a movement of the first and/or second engagement element in the circumferential element in the case of a cycloid movement of the first engagement element relative to the second engagement element.

By way of the eccentric shaft, in the case of a rotational movement of the eccentric shaft, the second engagement element can carry out translational movements in directions which are preferably oriented orthogonally with respect to a rotational axis of the eccentric shaft. A rolling movement of the second cam sections on the first cam sections takes place by way of the resulting translational movements of the second cam sections in the direction of the first engagement element. A rotational movement of the second engagement element relative to the first engagement element, preferably about the rotational axis, can in turn take place by way of said rolling movement of the second cam sections on the first cam sections. As a result, a relative movement of the first flange relative to the second flange can take place. This arrangement results in a high transmission ratio, the latter being realized by way of a simple and robust construction. The simple construction is distinguished, in particular, by the fact that merely the first engagement element has to be arranged on the second flange, with the result that the maintenance complexity is low.

The invention is based, inter alia, on the finding that currently used spur gear connections entail a multiplicity of disadvantages. In particular, the restricted transmission ratio size, the high wear, the maintenance complexity and the risk of tooth fracture result in a multiplicity of technical and economic disadvantages. Optimized wind tracking and/or an optimized blade adjustment can be realized by way of the adjustment unit in the area of the azimuth adjustment and/or in the area of the pitch adjustment. By way of the cam elements, a load distribution takes place to a large number of cam sections which are in engagement at the same time, with the result that substantially no tooth which is loaded in a focused manner is configured. Furthermore, the arrangement results in a considerably increased shock load-bearing capability which can be, for example, up to 500% higher. Moreover, a complicated prestressing means can be dispensed with. This results in a low-play and/or rigid arrangement.

In one preferred design variant of the adjustment unit, it is provided that the adjustment unit is configured as a pitch adjustment unit, and the first flange is configured as a hub flange and the second flange is configured as a rotor blade flange, or the first flange is configured as a rotor blade flange and the second flange is configured as a hub flange, and/or the adjustment unit is configured as an azimuth adjustment unit, and the first flange is configured as a motor casing flange and the second flange is configured as a tower flange, or the first flange is configured as a tower flange and the second flange is configured as a motor casing flange.

Furthermore, the second cam sections are preferably arranged on an outer circumferential face of the second engagement element, and the first cam sections are arranged on an inner circumferential face of the first engagement element, and the number of convex first cam sections of the first engagement element exceeds the number of concave second cam sections of the second engagement element by at least one, and/or that the second cam sections are arranged on an inner circumferential face of the second engagement element, and the first cam sections are arranged on an outer circumferential face of the first engagement element, and the number of concave second cam sections of the second engagement element exceeds the number of convex first cam sections of the first engagement element by at least one.

It is provided in one particularly preferred design variant that the adjustment unit comprises two or more drive units. Furthermore, the drive unit preferably comprises a motor and/or a transmission and/or a brake. The two or more drive units, in particular the motors, are preferably coupled to a synchronizing element.

A further preferred development of the adjustment unit is distinguished by the fact that it comprises two or more first engagement elements and/or two or more second engagement elements, the two or more first engagement elements preferably being arranged adjacently, in particular adjacently on the end side, with respect to one another, and/or the two or more second engagement elements preferably being arranged adjacently, in particular adjacently on the end side, with respect to one another. In the case of engagement elements of disk-shaped and/or ring-shaped configuration, engagement elements which are arranged in this way have surface orthogonals or passage axes which are oriented substantially in parallel. Furthermore preferably, said surface orthogonals or passage axes are oriented substantially parallel to a tower axis in the case of an adjustment unit which is configured as an azimuth adjustment unit and/or parallel to a rotor blade longitudinal axis in the case of an adjustment unit which is configured as a pitch adjustment unit.

Furthermore, it is preferred that the first engagement element and/or the first cam sections and/or the second engagement element and/or the second cam sections comprises/comprise a material with a dry running capability or consists/consist of said material, the material with a dry running capability preferably being a fiber reinforced epoxy resin composite material. As a result of a material of this type with a dry running capability, additional lubrication with grease and/oil is not necessary or is necessary merely to a reduced extent. This therefore results in a material with a dry running capability on one, two or more of the abovementioned elements in an adjustment unit which requires less maintenance.

It is provided in a further preferred design variant of the adjustment unit that the first engagement element and/or the second engagement element have/has an annular geometry, the first engagement element and the second engagement element preferably having passage axes which are arranged in parallel, said passage axes preferably being oriented, furthermore, parallel to a rotational axis of the eccentric shaft. Moreover, it is preferred that the first engagement element has an internal diameter which is greater than an external diameter of the second engagement element, and/or the first engagement element has an external diameter which is smaller than an internal diameter of the second engagement element.

A further particularly preferred design variant of the adjustment unit provides that the first engagement element is configured as a bolt ring and the first cam sections are configured as bolts, the bolts preferably being spaced apart from one another equidistantly in the circumferential direction and, furthermore, preferably having a bolt longitudinal axis, and being arranged in such a way that the bolt longitudinal axes are oriented substantially parallel to the rotational axis. Furthermore, it is preferred that the first cam sections are configured by way of spherical and/or partially spherical bodies. It is preferred, in particular, that the spherical and/or partially spherical bodies are spaced apart equidistantly in the circumferential direction. Furthermore, it can be preferred that one, two, more or all of the bolts are replaced by spherical and/or partially spherical bodies, in order to configure the first cam sections.

Furthermore, it is provided in one preferred design variant that the bolts and/or the spherical bodies and/or partially spherical bodies are mounted rotatably. In particular, it is preferred that they are mounted such that they can be rotated about an axis parallel to the eccentric shaft. A further preferred development of the adjustment unit is distinguished by the fact that the bolts and/or the spherical bodies and/or partially spherical bodies are suspended in a cardanic manner.

One preferred design variant provides that the adjustment unit for an azimuth adjustment and/or for a pitch adjustment of a wind turbine comprises a drive unit which can be arranged on a first annular flange and has an eccentric shaft which has a rotational axis, a bolt ring which can be arranged on a circumference of a second annular flange which is arranged such that it can be rotated with respect to the first annular flange, a multiplicity of equidistantly positioned bolts which are arranged on a circumferential face of the bolt ring, the bolts having, at least in sections, a convex, in particular round, cross section orthogonally with respect to a bolt longitudinal axis, and said bolt longitudinal axis being oriented substantially parallel to the rotational axis, a cam element, with substantially concave cam sections which are arranged on a radial circumferential face and correspond to the bolts, and the cam element being arranged in such a way that a plane orthogonal is oriented substantially parallel to the rotational axis, the eccentric shaft being arranged rotatably on the cam element, in particular at an eccentric point of the cam element, and the cam element being arranged and configured to carry out a rolling movement with the concave cam sections on the bolts.

The drive unit can preferably comprise an electric and/or hydraulic motor. Furthermore, it is preferred that the drive unit comprises two or more electric and/or hydraulic motors. The drive unit preferably has an output shaft which can be moved rotationally. Said output shaft is preferably configured as an eccentric shaft or comprises the latter in a region which adjoins that end of the output shaft which faces away from the drive unit. Said end of the eccentric shaft can be configured, for example, as a journal, the center axis of said journal being arranged outside the rotational axis of the eccentric shaft and therefore not being arranged coaxially. As an alternative, the eccentric shaft can preferably have a shaft which is arranged coaxially with respect to the rotational axis, an eccentrically arranged disk, for example, being arranged at that end of the shaft which faces away from the drive unit, said disk preferably being mounted, furthermore, rotatably on the cam element, for example, by means of an anti-friction bearing. Fundamentally, the eccentric shaft can assume any form of a shaft which can be driven rotationally with an eccentrically arranged element and/or an eccentric configuration.

In the case of the use of the adjustment unit as an azimuth adjustment unit, the rotational axis of the eccentric shaft is preferably arranged substantially parallel to the longitudinal axis of a wind turbine tower. In the case of the use of the adjustment unit as a pitch adjustment unit, the rotational axis of the eccentric shaft is preferably arranged substantially parallel to the longitudinal axis of a wind turbine rotor blade.

In one preferred design variant, the multiplicity of equidistantly positioned bolts are arranged on an inner circumferential face of the bolt ring. In a further preferred design variant, the multiplicity of equidistantly positioned bolts are arranged on an outer circumferential face of the bolt ring. Furthermore, it is preferred that the concave cam sections of the cam element are arranged on a radial outer circumferential face of the cam element. Moreover, it is preferred that the concave cam sections of the cam element are arranged on a radial inner circumferential face of the cam element. In particular, it is preferred that the multiplicity of equidistantly positioned bolts are arranged on an inner circumferential face of the bolt ring, and the concave cam sections of the cam element are arranged on a radial outer circumferential face of the cam element. As an alternative or in addition, it is preferred that the multiplicity of equidistantly positioned bolts are arranged on an outer circumferential face of the bolt ring, and the concave cam sections of the cam element are arranged on a radial inner circumferential face of the cam element.

The bolt ring preferably has an external diameter which is adapted to a circumference of the flange, on which the bolt ring is arranged. For example, the bolt ring can have an external diameter which has substantially the same dimensions as an internal diameter of the flange, on which the bolt ring is arranged. Furthermore, the bolt ring preferably has an internal diameter which is less than 100%, and/or less than 90%, and/or less 80%, and/or less than 70%, and/or less than 60%, and/or less than 50% of the external diameter of the flange, on which the bolt ring is arranged. Furthermore, the bolt ring preferably has an internal diameter which is less than 100%, and/or less than 90%, and/or less than 80%, and/or less than 70%, and/or less than 60%, and/or less than 50% of the internal diameter of the flange, on which the bolt ring is arranged.

The bolt ring can either be provided as a separate component on a wind turbine, or can be configured integrally as part of a further component, for example, a flange or a bearing. The bolt ring is configured, in particular, in such a way that the multiplicity of equidistantly positioned bolts can be arranged and/or fastened on a (preferably radial) inner and/or outer circumferential face. For example, on its inner and/or outer circumferential face, the bolt ring can have recesses which are spaced apart equidistantly, for example, in the form of cavities and/or notches, in which the bolts can be arranged. Furthermore, there is the possibility of separate fastening of the bolts to the bolt ring, for example, by way of a non-positive, positively locking and/or integrally joined connection. Furthermore, the bolts can be connected integrally to the bolt ring, it being preferred, in particular, that the bolt ring which comprises the bolts integrally is produced as a cast part or is produced in a manner which is machined from a solid material, in particular by way of milling. As an alternative or in addition, the bolts can also be arranged with further elements. The equidistant arrangement of the bolts relates, in particular, to equidistant spacing of the bolts in the circumferential direction of the bolt ring.

The bolts preferably have a longitudinal extent which, furthermore, is preferably oriented substantially parallel to the rotational axis of the eccentric shaft. Furthermore, the bolts preferably have a cross section in the orthogonal direction with respect to the longitudinal extent. The cross section can have, for example, a circular and/or oval geometry. Moreover, the cross section can also be of semicircular or semi-elliptic configuration. In the case of a semicircular or semi-elliptic cross section, it is preferred that the round section of the bolt faces the center point of the bolt ring. Furthermore, it is preferred that the straight section of the semicircular or semi-elliptic pin is arranged substantially parallel to the tangential direction of the bolt ring. In a further preferred development, the bolts can have an angular, for example, a triangular and/or rectangular, cross section. Furthermore, it is preferred that the bolts, in particular an inner circumference and/or outer circumference which is formed by way of the bolts which are arranged in an annular manner, have a negative geometry of the cam sections of the cam element, at least in sections. The bolts can be arranged as separate elements on the bolt ring or on the component which is configured integrally with the bolt ring. As an alternative, the bolts can also be connected integrally to the bolt ring or the component which is configured integrally with the bolt ring.

The cam element can be configured, for example, as a cam disk. The cam element which is configured as a cam disk preferably has openings and/or cutouts which are configured, in particular, in such a way that transverse forces can be transmitted via them. In particular, the openings and/or cutouts are configured in such a way that the eccentric shafts which are arranged in said openings and/or cutouts can transmit transverse forces to the cam element, in particular to the cam disk. Furthermore, it is preferred that the cam element has an annular geometry. On a radial outer and/or inner circumferential face, the cam element preferably has substantially concave cam sections which correspond to the bolts. The corresponding configuration of the cam sections to the bolts is preferably designed in such a way that the cam sections can carry out a rolling movement on the bolts, and the rolling movement therefore results in a force which acts in the tangential direction on the cam element. The concave cam sections can be configured, for example, by way of recesses on the cam element. Furthermore, convex sections can also be configured by way of the concave cam sections. Furthermore, the concave and convex cam sections are preferably arranged distributed homogeneously over the outer and/or inner circumference of the cam element. In order to make an improved rolling movement possible, said convex sections of the cam element are preferably configured as convex cam sections. The convex sections can completely or in sections have a negative geometry of the intermediate space of two adjacent bolts. Furthermore, the convex sections can also completely or in sections have a geometry which corresponds to the bolts.

With consideration of the convex cam sections, the cam element preferably has an external or internal diameter which has the same dimensions as the internal or external diameter of the bolt ring with consideration of the bolts. Furthermore, the bolt ring can also have an internal and/or external diameter which has a greater magnitude than the external and/or internal diameter of the cam element with consideration of the convex cam sections. Furthermore, the cam element preferably has an external diameter which corresponds to the same magnitude as the dimension of the greatest distance between two bolts. Furthermore, the cam element preferably has an external diameter which is less than 100%, and/or less than 90%, and/or less than 80%, and/or less than 70%, and/or less than 60%, and/or less than 50% of the internal diameter of the bolt ring. Furthermore, the cam element preferably has an external diameter which is smaller than the greatest dimension between the low point between two bolts and a bolt which is arranged opposite. Furthermore, the cam element preferably has an internal diameter which corresponds to the same magnitude as the dimension of the greatest distance between two bolts. Furthermore, the cam element preferably has an internal diameter which is more than 100%, and/or more than 110%, and/or more than 120%, and/or more than 130%, and/or more than 140%, and/or more than 150% of the external diameter of the bolt ring.

By way of the eccentric shaft, in the case of a rotational movement of the eccentric shaft, the cam element can carry out translational movements in directions which are oriented orthogonally with respect to the rotational axis of the eccentric shaft. A rolling movement of the cam sections on the bolts takes place by way of said translational movements of the concave cam sections in the direction of the bolt ring. A rotational movement of the cam element relative to the bolt ring about the rotational axis can in turn take place by way of said rolling movement of the concave cam sections on the bolts. As a result, a relative movement of the first flange relative to the second flange can take place. This arrangement results in a very high transmission ratio, said transmission ratio being realized by way of a simple and robust construction. The simple construction is distinguished, in particular, by the fact that merely the bolt ring and the bolts are to be arranged on the second flange, with the result that the maintenance complexity is extremely low.

The cam element preferably consists of an abrasion-resistant and/or low-wear material or comprises said material. Furthermore, the cam element preferably consists of a metallic material or comprises said material. In particular, it is preferred that said material is aluminum and/or steel. In particular, high-strength steels and/or steel alloys are preferred. Furthermore, the cam element can preferably also consist of a plastic, for example, a reinforced, preferably fiber-reinforced, plastic, or can comprise said material.

It is provided in one preferred design variant of the adjustment unit that the adjustment unit is configured as a pitch adjustment unit, and the first flange is configured as a hub flange and the second flange is configured as a rotor blade flange, and/or the adjustment unit is configured as an azimuth adjustment unit, and the first flange is configured as a motor casing flange and the second flange is configured as a tower flange. The configuration of the adjustment unit as a pitch adjustment unit and/or as an azimuth adjustment unit results in the particular advantage that the adjustment unit has an extremely low overall size in comparison with conventional adjustment units, which results in a compact design. This in turn results in the fact that the hub and/or a motor casing can be configured with a smaller overall size.

It is provided according to a further preferred design variant of the adjustment unit that the concave cam sections are arranged on an outer circumferential face of the cam element, and a number of bolts are arranged on an inner circumferential face of the bolt ring, and the concave cam sections of the cam element are configured as a number of recesses, and the number of bolts of the bolt ring exceeds said number by at least one, and/or the concave cam sections are arranged on an inner circumferential face of the cam element, and a number of bolts are arranged on an outer circumferential face of the bolt ring, and the concave cam sections of the cam element are configured as a number of recesses, and the number of recesses exceeds the number of bolts of the bolt ring by at least one. The adjustment unit which is configured in this way ensures that each cam section rolls successively on adjacently arranged bolts, with the result that the wear phenomena are reduced further.

A further preferred development of the adjustment unit is distinguished by the fact that the adjustment unit comprises two or more drive units. The arrangement of two or more drive units can ensure that high drive forces can be provided and therefore a reliable transmission ratio of load can be ensured. In particular, it is preferred that the two or more drive units are arranged equidistantly on a circumference of the first flange. As an alternative, the drive units are preferably not arranged equidistantly on the circumference of the first flange, but rather are combined, for example, in groups which in turn can be arranged in an equidistant or non-equidistant manner.

Furthermore, it is preferably provided that the drive unit comprises a motor and/or a transmission and/or a brake. In particular, it is preferred that the motor is configured as an electric motor and/or hydraulic motor. Moreover, it is preferred that the transmission is a planetary transmission. In particular, it is preferred that the transmission has a transmission ratio of less than or equal to 10, or greater than 10, further preferably of greater than 20, particularly preferably of greater than 30. Said transmission ratio is considerably lower than the usually provided transmission ratio which lies, for example, at 200, with the result that a smaller overall size can be achieved. By way of the transmission ratio, the rotational speed is reduced from the drive side to the output side, and the torque is increased from the drive side to the output side. As a consequence of the increased torque, it is preferred that the output side, on which, in particular, the eccentric shaft is arranged, is supported as a consequence of high transverse forces. This can take place, for example, by way of a suitable guide or a bearing.

By way of the arrangement of a motor and a transmission, the transmission output shaft preferably configuring or comprising the eccentric shaft, a correspondingly great transmission ratio of the motor rotational speed can be converted into a relatively slow rotational movement with a high torque in the region of the drive unit. Furthermore, an arrangement of a brake in the region of the drive unit has the advantage that a rotational movement, for example, of the pitch drive and/or the azimuth drive, can be braked here, and a standstill is preferably achieved. In this state, for example, a correspondingly arranged locking device can lock the motor casing or a rotor blade.

Furthermore, it is preferred that the two or more drive units, in particular the motors, are coupled to a synchronizing element. In particular, it is preferred that the synchronizing element has a maximum transmission torque of greater than 200 Nm, and/or greater than 250 Nm, and/or greater than 300 Nm, and/or greater than 320 Nm, and/or greater than 350 Nm. The synchronizing element is based on the finding that a plurality of arranged drive units or their motors do not have substantially the exact same rotational angles as at the time of installation at least after a multiplicity of operating hours. It is desirable, however, that the drive units have substantially the same, predefined rotational angle with respect to one another, in order to realize or to ensure an optimum rolling movement of the cam sections on the bolts and a corresponding prestress. In particular, it is preferred that the synchronizing element is configured as a belt, said belt being arranged as far as possible without slip on rotatable elements of the two or more drive units. In particular, the belt is arranged on rotatable elements which are to have the same rotational speed. As an alternative, the synchronizing element is preferably configured as a synchronizing chain.

Furthermore, the plurality of drive units are preferably synchronized with one another by way of a software controller, preferably an electric software controller. Moreover, a synchronization can be achieved via a motor controller. Furthermore, the synchronization preferably takes place by means of an intermediate countershaft which is configured, in particular, as a gear stage without a transmission ratio.

A further preferred development of the adjustment unit is distinguished by the fact that a drive unit has a motor, and a second drive unit is driven by means of the synchronizing element.

A further particularly preferred design variant of the adjustment unit provides that it comprises two or more cam elements which preferably in each case have an engagement region on the bolt ring, the engagement regions preferably being spaced apart, furthermore, equidistantly from one another in the circumferential direction. An engagement region of a cam element on the bolt ring is distinguished, in particular, by the fact that the cam sections are in touching contact here with the bolts. It can be deduced that the location of the engagement regions is variable. The center point of an engagement region in the circumferential direction is formed, in particular, by way of the cam section which bears substantially completely against a bolt. The equidistant spacing of the engagement regions relates, in particular, to the center point of the engagement regions. In the case of two arranged cam elements, it is particularly preferred that the center points of the engagement regions are arranged so as to lie opposite one another. In the case of three arranged cam elements, it is particularly preferred that there is substantially a spacing in the circumferential direction of 120 degrees between the center points of the engagement regions. The two or more cam elements are preferably arranged adjacently with respect to one another in the direction of the rotational axis. In the operating state of an adjustment unit for an azimuth adjustment, the cam elements are arranged, for example, partially above one another.

It is provided in a further preferred design variant of the adjustment unit that the bolts and/or the at least one cam element comprise/comprises a material with a dry running capability or consist/consists of said material, the material with a dry running capability preferably being a fiber reinforced epoxy resin composite material. By way of a material of this type with a dry running capability for the bolts, additional lubrication with grease and/or oil is not necessary or is necessary merely to a reduced extent. This therefore results in a material with a dry running capability on the bolts in an adjustment unit which requires less maintenance.

In accordance with a further aspect of the present invention, provided is an adjustment apparatus for an azimuth adjustment and/or for a pitch adjustment of a wind turbine, comprising a first annular flange and a second annular flange which are arranged such that they can be rotated on one another, and an adjustment unit in accordance with at least one of the design variants described in the preceding text, the drive unit being arranged on the first annular flange, the first engagement element which is preferably configured as a bolt ring being arranged on a circumference of the second annular flange, and the second engagement element which is preferably configured as a cam element being arranged and configured to bring about a (preferably rotational) relative movement between the first flange and the second flange in the case of a rotation of the eccentric shaft. Furthermore, it can be preferred that the drive unit is arranged on the second annular flange, and the bolt ring is arranged on a circumference of the first annular flange.

In accordance with a further aspect of the present invention, provided is a pitch adjustment apparatus for the rotor blade adjustment of a rotor blade of a rotor of a wind turbine, comprising a substantially annular hub adapter with an annular hub flange, the hub adapter being configured to be fastened to a hub of a wind turbine, or forming a part of the hub, a substantially annular rotor blade adapter with an annular rotor blade flange, the rotor blade adapter being configured to be fastened to a rotor blade of a wind turbine, or forming a part of the rotor blade, the annular hub flange being arranged such that it can be rotated relative to the annular rotor blade flange, an adjustment unit according to at least one of the design variants which are described in the preceding text, the hub adapter being arranged substantially coaxially with respect to the rotor blade adapter, the drive unit being arranged on the annular hub flange, and the first engagement element which is preferably configured as a bolt ring being arranged on the annular rotor blade flange.

The cam element is, in particular, arranged and configured in such a way as to carry out a rolling movement with the concave cam sections on the bolts, in order to bring about a (preferably rotational) relative movement between the hub flange and the rotor blade flange in the case of a rotation of the eccentric shaft.

The hub adapter is preferably connected integrally to the hub and/or is a part of the hub. Furthermore, the hub adapter is preferably configured merely as a hub flange which is preferably arranged integrally on the hub. Furthermore, the rotor blade adapter is preferably connected integrally to the rotor blade and/or is a part of the rotor blade. Furthermore, the rotor blade adapter is preferably configured merely as a rotor blade flange which is preferably arranged integrally on the hub. The drive unit is arranged on the hub flange, in order that a feed of supply media, for example, an electric current, is simplified. Accordingly, the first flange is configured here as a hub flange. The bolt ring is arranged on the second flange, the second flange being configured here as a rotor blade flange. In a further preferred design variant, the first flange is configured as a rotor blade flange and the second flange is configured as a hub flange.

One preferred development of the pitch adjustment apparatus is distinguished, furthermore, by the fact that the hub adapter is coupled to the rotor blade adapter by means of a pitch bearing, in particular an anti-friction bearing, and the first engagement element which is preferably configured as a bolt ring being arranged on a circumferential face, in particular on an inner and/or outer circumferential face, of the pitch bearing. In particular, it is preferred that the bolt ring is arranged on an inner and/or outer circumferential face of the outer ring of the pitch bearing. This development is preferred, furthermore, because the pitch bearing can be produced together with the bolt ring, and advantages can therefore be achieved in the production. Furthermore, the overall size of the pitch adjustment apparatus is reduced by way of said arrangement.

In accordance with a further aspect of the invention, provided is an azimuth adjustment apparatus for wind direction tracking of a motor casing of a wind turbine, comprising a substantially annular motor casing adapter with an annular motor casing flange, the motor casing adapter being configured to be fastened to a motor casing of a wind turbine, or to form a part of the motor casing, a substantially annular tower adapter with an annular tower flange, the tower adapter being configured to be fastened to a tower of a wind turbine or to form a part of the tower, the motor casing flange being arranged such that it can be rotated relative to the tower flange, an adjustment unit according to at least one of the design variants which are described in the preceding text, the tower adapter being arranged substantially coaxially with respect to the motor casing adapter, the drive unit being arranged on the annular motor casing flange, and the first engagement element which is preferably configured as a bolt ring being arranged on the annular tower flange. Furthermore, there is likewise the possibility that the drive unit is arranged on the annular tower flange, and the bolt ring is arranged on the annular motor casing flange.

The cam element is, in particular, arranged and configured in such a way as to carry out a rolling movement with the concave cam sections on the bolts, in order to bring about a relative movement between the motor casing flange and the tower flange in the case of a rotation of the eccentric shaft.

The motor casing adapter is preferably connected integrally to the motor casing and/or is a part of the motor casing. Furthermore, the motor casing adapter is preferably configured merely as a motor casing flange which is preferably arranged integrally on the motor casing. Furthermore, the tower adapter is preferably connected integrally to the tower and/or is a part of the tower. Furthermore, the tower adapter is preferably configured merely as a tower flange which is preferably arranged integrally on the tower.

It is provided in one preferred design variant of the azimuth adjustment apparatus that the motor casing adapter is coupled to the tower adapter by means of an azimuth bearing, in particular an anti-friction bearing, and the first engagement element which is preferably configured as a bolt ring being arranged on a circumferential face, in particular on an inner and/or outer circumferential face, of the azimuth bearing.

In accordance with a further aspect of the present invention, provided is a wind turbine, comprising a wind turbine tower, a motor casing, a rotor with a hub and at least one rotor blade, with an adjustment unit according to at least one of the design variants mentioned in the preceding text, and/or at least one adjustment apparatus in accordance with the aspect which is described in the preceding text, and/or at least one pitch adjustment apparatus in accordance with the aspect which is described in the preceding text, and/or an azimuth adjustment apparatus in accordance with the aspect which is described in the preceding text.

In accordance with a further aspect of the present invention, provided is a method for the rotor blade adjustment of a rotor blade of a rotor of a wind turbine, comprising providing of a rotor with at least one rotor blade, an adjustment unit according to at least one of the design variants described in the preceding text and/or an adjustment apparatus in accordance with the aspect described in the preceding text being arranged on the rotor blade and on the hub, actuating of at least one drive unit, in particular a motor, in order to drive the eccentric shaft, and to move the second engagement element which is preferably configured as a cam element on a cycloid movement path, and therefore to rotate the rotor blade about a longitudinal axis.

In accordance with a further aspect of the present invention, provided is a method for wind direction tracking of a motor casing of a wind turbine, comprising providing of a tower and a motor casing, an adjustment unit according to at least one of the design variants described in the preceding text and/or an adjustment apparatus in accordance with the aspect described in the preceding text being arranged on the tower and on the motor casing, actuating of at least one drive unit, in particular a motor, in order to drive the eccentric shaft and to move the second engagement element which is preferably configured as a cam element on a cycloid movement path, and therefore to rotate the motor casing about a longitudinal axis.

In accordance with a further aspect of the present invention, provided is an adjustment unit according to at least one of the design variants described in the preceding text and/or an adjustment apparatus in accordance with the aspect described in the preceding text as a pitch adjustment apparatus of a wind turbine and/or as an azimuth adjustment apparatus of a wind turbine and/or for the rotor blade adjustment of a rotor blade of a rotor of a wind turbine and/or for wind direction tracking of a motor casing of a wind turbine.

The methods according to the invention and their possible developments have features and/or method steps which make them suitable for use, in particular, for an adjustment unit according to the invention and its developments and/or for an adjustment apparatus and/or an azimuth adjustment apparatus and/or a pitch adjustment apparatus and their/its developments. Reference is also made to the previous description in respect of the corresponding features and developments of the adjustment unit for further advantages, design variants and design details of said further aspects and their possible developments.

BRIEF DESCRIPTION OF THE SEVERAL VIEWS OF THE DRAWINGS

Preferred embodiments of the invention will be described by way of example on the basis of the appended figures, in which.

In the figures, identical elements or elements with a substantially identical or similar function are denoted by the same designations.

DETAILED DESCRIPTION

Figure 1:
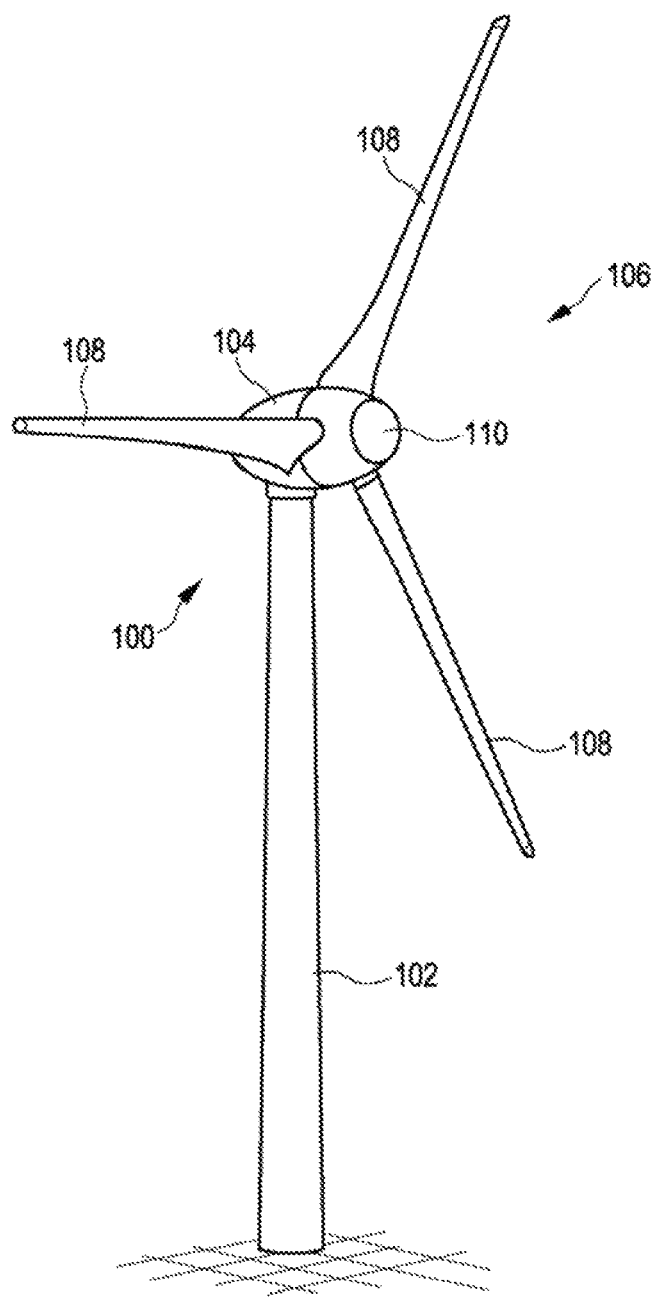
FIG. 1: shows a diagrammatic, three-dimensional view of one exemplary embodiment of a wind turbine.

FIG. 1 shows a diagrammatic, three-dimensional view of one exemplary embodiment of a wind turbine. FIG. 1 shows, in particular, a wind turbine 100 with a tower 102 and a nacelle 104. A rotor 106 with three rotor blades 108 and a spinner 110 is arranged on the nacelle 104. During operation, the rotor 106 is set in a rotational movement by way of the wind and, as a result, drives a generator on the nacelle 104. Furthermore, the wind turbine 100 has an adjustment unit in the nacelle 104 at the connecting point between the tower 102 and a motor casing, which adjustment unit makes the rotation of the nacelle 104 with the rotor 106 possible in a horizontal plane without the use of a spur gear mechanism, by an adjustment unit according to the invention being provided. Moreover, the rotor 106 has in each case an adjustment unit according to the invention at the connecting point between a hub and the rotor blades 108.

FIGS. 2-5 relate, in particular, to adjustment units of this type, in the case of which the second cam sections are arranged on an outer circumferential face of the second engagement element, and the first cam sections are arranged on an inner circumferential face of the first engagement element, a plurality of drive units with a motor and a transmission are arranged, and in the case of which two first engagement elements which are adjacent on the end side are arranged. Furthermore, the adjustment units which are shown have first and second engagement elements of annular configuration which have passage axes which are oriented in parallel, the first engagement element having an external diameter which is smaller than an internal diameter of the second engagement element. Furthermore, the first engagement element is configured as a bolt ring and the first cam sections are configured as bolts, the bolts being spaced apart from one another equidistantly in the circumferential direction and, furthermore, having a bolt longitudinal axis and being arranged in such a way that the bolt longitudinal axes are oriented substantially parallel to the rotational axis.

Figure 2:
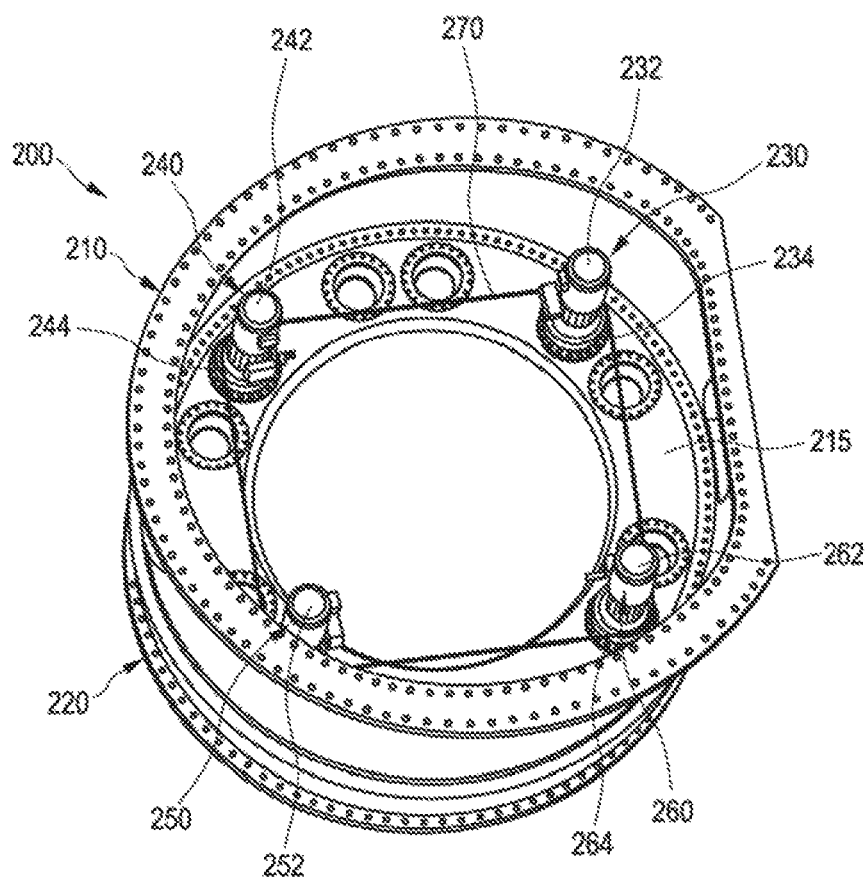
FIG. 2: shows a diagrammatic, three-dimensional view of one exemplary embodiment of a pitch adjustment apparatus with four drive units.

FIG. 2 shows a diagrammatic, three-dimensional view of one exemplary embodiment of a pitch adjustment apparatus with four drive units. The pitch adjustment apparatus 200 has a hub adapter 210 and a rotor blade adapter 220. The hub adapter 210 and the rotor blade adapter 220 in each case have an annular geometry with a circular cross section. Moreover, the hub adapter 210 and the rotor blade adapter 220 have substantially the same diameter. Furthermore, the rotor blade adapter 220 and the hub adapter 210 are arranged coaxially on one another, said arrangement being designed so as to be mounted rotatably between the adapters 210, 220. In particular, an anti-friction bearing is arranged between the two adapters 210, 220. A first flange 215 is arranged on an inner circumferential region of the hub adapter 210, which inner circumferential region faces the rotor blade adapter. The first flange 215 is of annular configuration, furthermore, the external diameter of the first flange 215 corresponding substantially to the internal diameter of the hub adapter 210. The spacing between the external diameter and the internal diameter of the first flange 215 is configured in such a way that the latter can receive drive units 230, 240, 250, 260.

For this purpose, furthermore, passage openings are provided on the first flange 215, a passage direction of said passage openings being oriented substantially parallel to a passage axis of the hub adapter 210 and the rotor blade adapter 220. The drive units 230, 240, 250, 260 in each case comprise a motor 232, 242, 252, 262 and a transmission 234, 244, 264, the transmissions 234, 244, 264 not being compulsory elements of the adjustment apparatus here. The transmission 234 is arranged within a transmission housing 236. A point is provided in each case between the motors 232, 242, 252, 262 and the associated transmissions 234, 244, 264, at which point a synchronizing element 270 which is configured here in the form of a synchronizing belt can be arranged. The synchronizing element 270 is wound around each drive unit in each case with a wraparound angle of 90°. Furthermore, the drive units 230, 240, 250, 260 are arranged equidistantly on the first flange 215.

Figure 3:
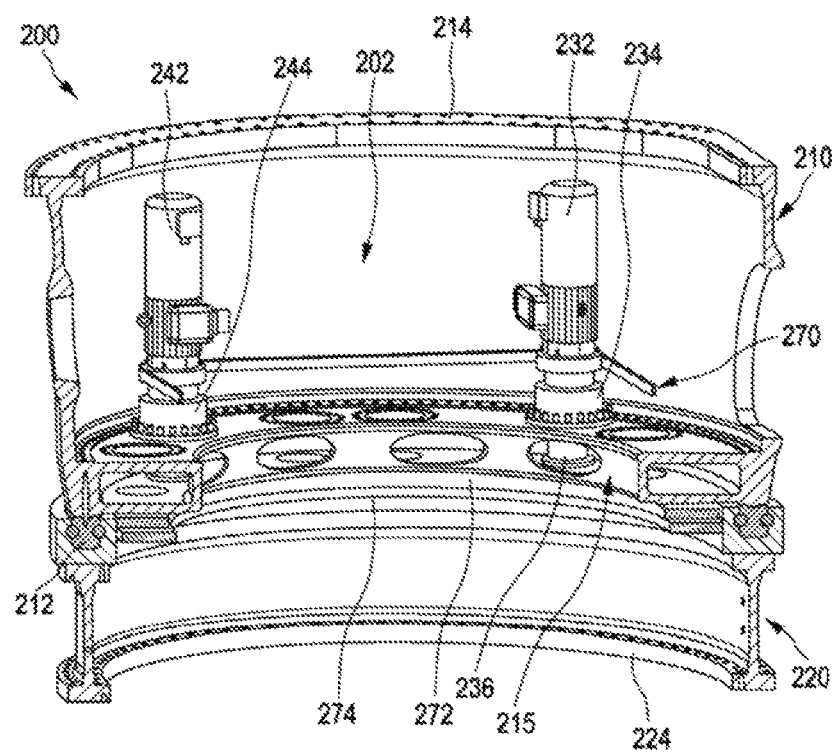
FIG. 3: shows a diagrammatic, three-dimensional sectioned view of the pitch adjustment apparatus from FIG. 2, FIG. 4: shows a diagrammatic, two-dimensional view of one exemplary embodiment of an azimuth adjustment apparatus.

In particular, FIG. 3 shows the connection between the hub adapter 210 and the rotor blade adapter 220 by means of a bearing 212. Moreover, the cam elements 272, 274 are arranged on the eccentric shafts of the drives, fixed mounting by means of an anti-friction bearing being preferred here, in particular. An eccentric shaft (not shown) is arranged eccentrically on the first cam element 272. In the present case, the cam elements 272, 274 are configured as ring elements which, on their radial outer circumferential face, have cam sections (not shown here) which correspond to bolts (likewise not shown) which are arranged on the inner circumferential face of the bearing 212 and in the longitudinal direction in the direction of the passage axis of the adapters 210, 220. Moreover, a first connecting flange 214 is arranged on the hub adapter 210 on the end side which faces away from the rotor blade adapter 220. The first connecting flange 214 is arranged and configured, in particular, to fasten the hub adapter 210 to a hub of a rotor of a wind turbine. As an alternative, the hub adapter 210 can also preferably be an integral constituent part of the hub. Moreover, the rotor blade adapter 220 has a second connecting flange 224 which is arranged and configured to fasten the rotor blade adapter 220 to a rotor blade. As an alternative, the rotor blade adapter 220 can also preferably be connected integrally to a rotor blade.

Figure 4:
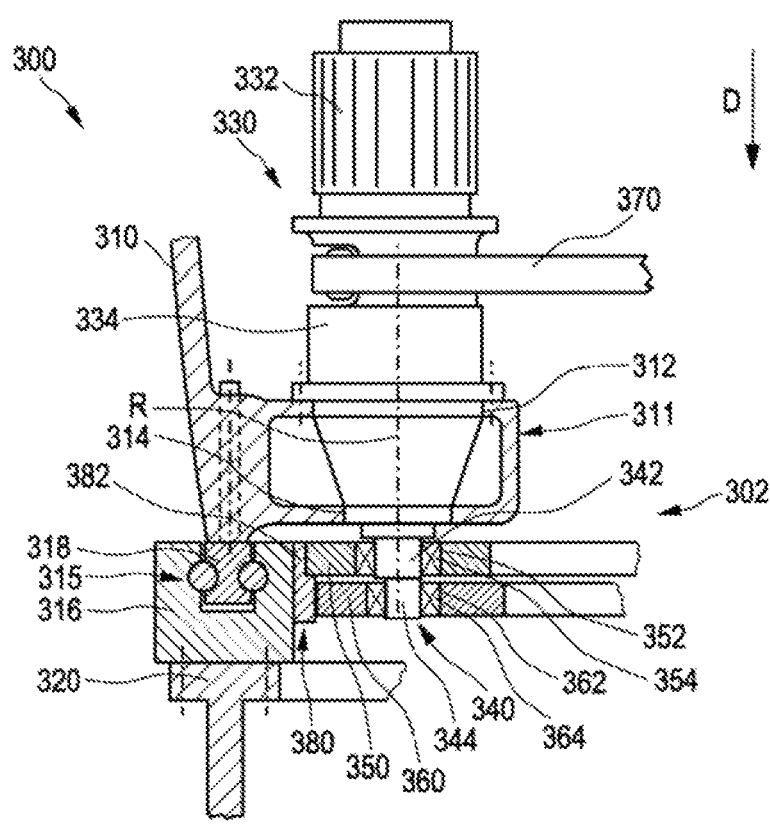

FIG. 4 shows a diagrammatic, two-dimensional view of one exemplary embodiment of an azimuth adjustment apparatus. The azimuth adjustment apparatus 300 has a tower adapter 320. The tower adapter is configured as an annular element which is of rotationally symmetrical configuration about a passage axis D. On the end side, the tower adapter 320 has a bearing 315 which has an anti-friction bearing outer ring 316 and an anti-friction bearing inner ring 318 which is mounted by way of rolling elements in said anti-friction bearing outer ring 316. Furthermore, an annular motor casing adapter 310 is arranged on said end side of the tower adapter 320. The motor casing adapter 310 is likewise configured as an annular element which is of rotationally symmetrical configuration about the passage axis D. Furthermore, the motor casing adapter 310 is arranged coaxially with respect to the tower adapter 320. On the end side, the motor casing adapter 310 is connected to the anti-friction bearing inner ring 318. The motor casing adapter 310 is therefore arranged on the tower adapter 320 such that it can be rotated about the passage axis D.

Furthermore, the motor casing adapter 310 has a first flange 311. The first flange 311 has a hollow-annular geometry with an internal diameter and an external diameter. Furthermore, the first flange 311 has a cavity between an upper side and a lower side, and between the external diameter and the internal diameter. Moreover, the first flange 311 has passage openings, the passage direction of which is parallel to the passage direction D. An upper flange opening 312 which faces away from the tower adapter and a lower flange opening 214 which faces the tower adapter 320 are produced by way of the through opening, by way of the cavity in the first flange 311. A transmission 334, in particular a planetary transmission, is arranged in the upper flange opening 312 and the lower flange opening 314. The drive axis of said transmission 334 faces away from the tower adapter 320, and the output shaft of the transmission 334 faces the tower adapter 320. A motor 332 is arranged at that end of the transmission 334 which faces away from the tower adapter 320. The motor 332 has an output shaft (not shown), the rotational axis of which is arranged parallel to the passage direction D and coaxially with respect to the rotational axis R. The drive shaft of the transmission 334 is driven by way of said output shaft, with the result that an output shaft of the transmission 334, which output shaft faces the tower adapter 320, is driven by way of the motor 332.

The output shaft of the transmission 334 is configured as an eccentric shaft 340 which comprises a first eccentric shaft section 342 which faces the transmission 334, and a second eccentric shaft section 344 which faces away from the transmission 334. The center axes of the first eccentric shaft section 342 and the second eccentric shaft section 344 are arranged parallel to the rotational axis R, but not coaxially. Therefore, they are eccentric and therefore form the eccentric shaft 340. The first eccentric shaft section 342 is mounted in a first cam element opening 352 of a first cam element 350 such that it can be rotated by means of a first eccentric shaft bearing 354. The first cam element 350 has an annular geometry, its passage axis being arranged parallel to the passage direction D. On its radial outer circumferential face, the first cam element 350 has concave cam sections, between which convex regions are preferably also arranged. In an analogous manner with respect to the first cam element 350, the second eccentric shaft section 344 is arranged in a second cam element opening 362 of a second cam element 360 by means of an anti-friction bearing 364.

In the present case, the inner circumferential face of the anti-friction bearing outer ring 316 is configured as a bolt ring 380, a multiplicity of bolts 382 being arranged on the bolt ring 380. The bolts 382 are preferably arranged equidistantly on the inner radius of the bolt ring. In particular, the bolts 382 and the cam elements 350, 360 are arranged and configured such that they can carry out a rolling movement on the bolts 382. The rolling movement on the bolts 382 by way of the cam elements 350, 360 takes place, in particular, by virtue of the fact that the cam elements are always displaced in directions orthogonally with respect to the rotational axis or passage direction D by way of the eccentric mounting and the eccentric shaft 342, 344. An exertion of force in the circumferential direction of the bolt ring 380 takes place by way of the engagement of the cam sections of the cam elements 350, 360 on the bolts 382. Since the tower adapter 320 is preferably connected fixedly to a tower which is arranged such that it cannot rotate, the motor casing adapter 310 rotates relative to the tower adapter 320 as a consequence of a movement of the eccentric shaft sections 342, 344 about the rotational axis R.

Furthermore, the drive unit 330, comprising the motor 332 and the transmission 334, has a synchronizing element 370 which is configured as a synchronizing belt. The synchronizing belt 370 connects a region arranged between the motor 332 and the transmission 334 to regions of the same type of further drive units, with the result that the rotational movements of the two or more drive units of an azimuth adjustment apparatus 300 are synchronized. The fundamental construction (shown in FIG. 4) of an azimuth adjustment apparatus 300 also corresponds (with the necessary adaptations) to that of a pitch adjustment apparatus.

Figure 5:
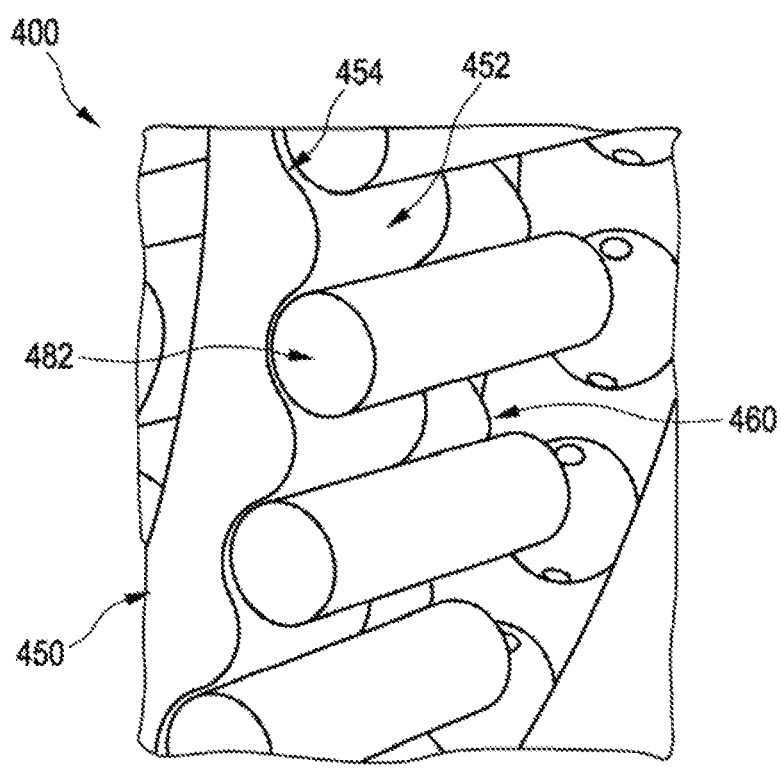
FIG. 5: shows a diagrammatic, three-dimensional detailed view of one exemplary embodiment of an azimuth adjustment apparatus.

FIG. 5 shows a diagrammatic, three-dimensional detailed view of one exemplary embodiment of an azimuth adjustment apparatus. FIG. 5 shows, in particular, an azimuth adjustment apparatus 400 with a first cam element 450 and a second cam element 460. In particular, furthermore, the bolts 482 are shown. In particular, FIG. 5 shows a possible geometry of a cam element 450, in particular of a radial outer circumferential face 452 of a cam element 450 with substantially concave cam sections 454. The mechanism of the azimuth adjustment apparatus 400 becomes clear by way of the concave cam sections 454 and the circular configuration of the bolts 482. A rolling movement takes place by way of forces by way of a movement of the first cam element 450 orthogonally with respect to a longitudinal direction of the bolts 482. Said forces are in turn produced, inter alia, in the circumferential direction, by the cam element 450 being moved closer to the bolts in the orthogonal direction with respect to the passage direction and with respect to the circumferential direction. Said moving closer in turn takes place by way of the eccentric mounting of the eccentric shaft which ensures by way of the drive of the motor that the rolling movement takes place.

Figure 6:
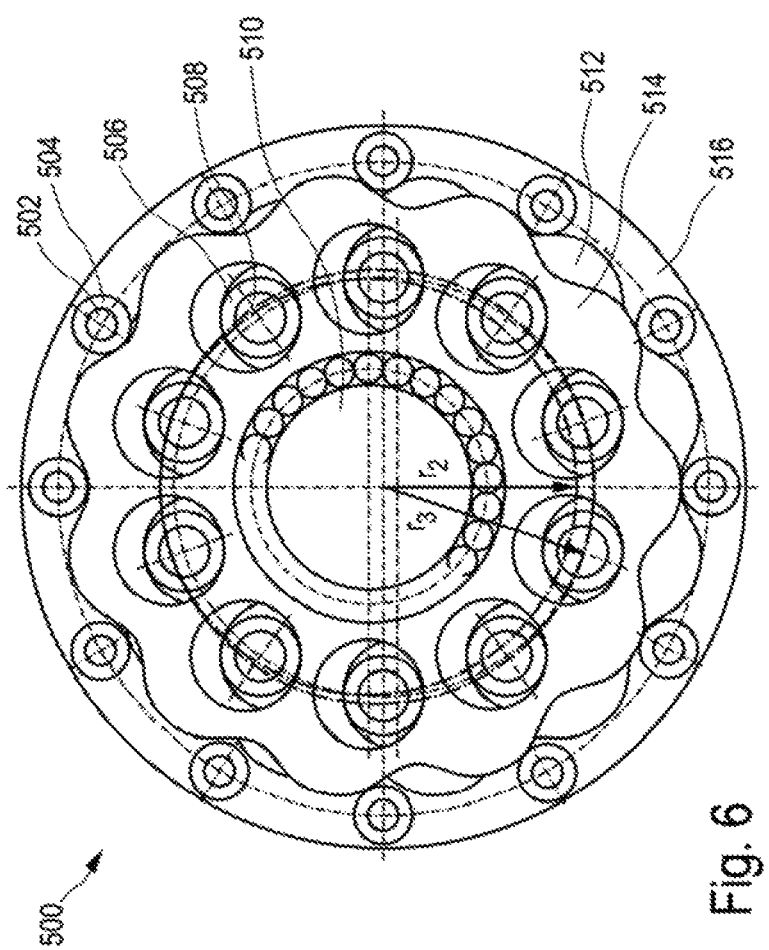
FIG. 6: shows a diagrammatic, two-dimensional sectional view of a cam disk mechanism which is known in the prior art.
Figure 7:
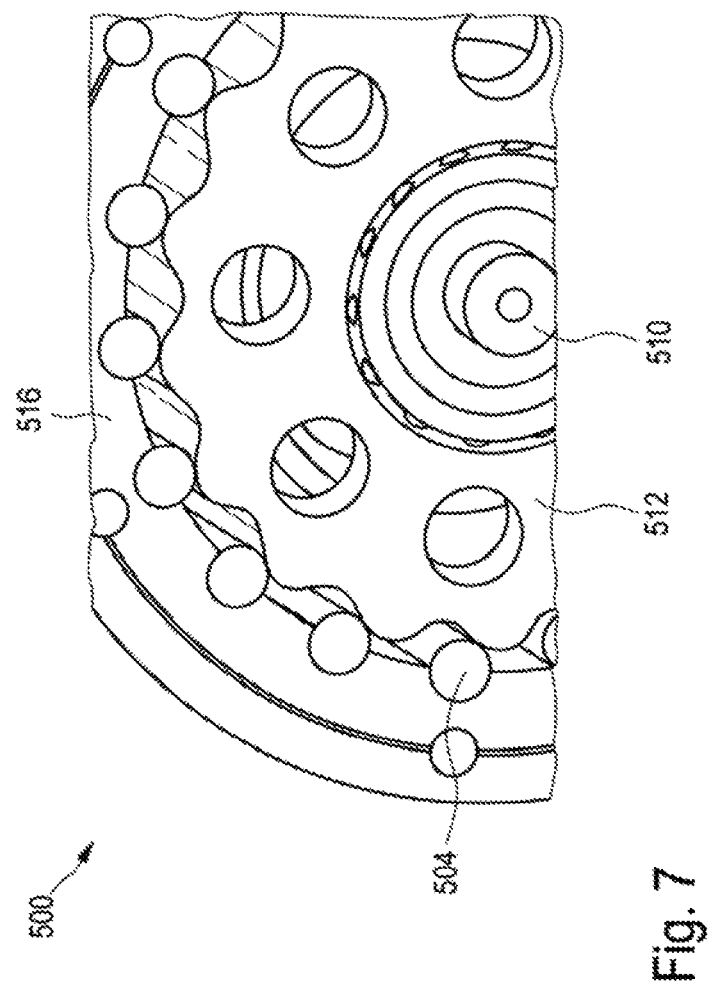
FIG. 7: shows a diagrammatic, three-dimensional view of the cam disk mechanism which is shown in FIG. 6, FIG. 8: shows a diagrammatic, two-dimensional view of one exemplary embodiment of a second engagement element with a hypocycloid toothing system.

FIG. 6 and FIG. 7 show diagrammatic sectional views of a cam disk mechanism 500 which is known in the prior art and has a first engagement element 512 and a second engagement element 514. The first engagement element 512 has a bolt ring 516 and twelve bolts 504. The bolts 504 are mounted such that they can be rotated about their rotational axis by means of a needle bearing 502. The output shafts 506 are mounted within passage openings of the second engagement element 514, the output shafts 506 being configured in the region of the second engagement element 514 as a cam roller with a bearing 508. The drive of the second engagement element 514 takes place via an eccentric shaft 510 which is mounted at the center point of the second engagement element 514 by means of an anti-friction bearing.

Figure 8:
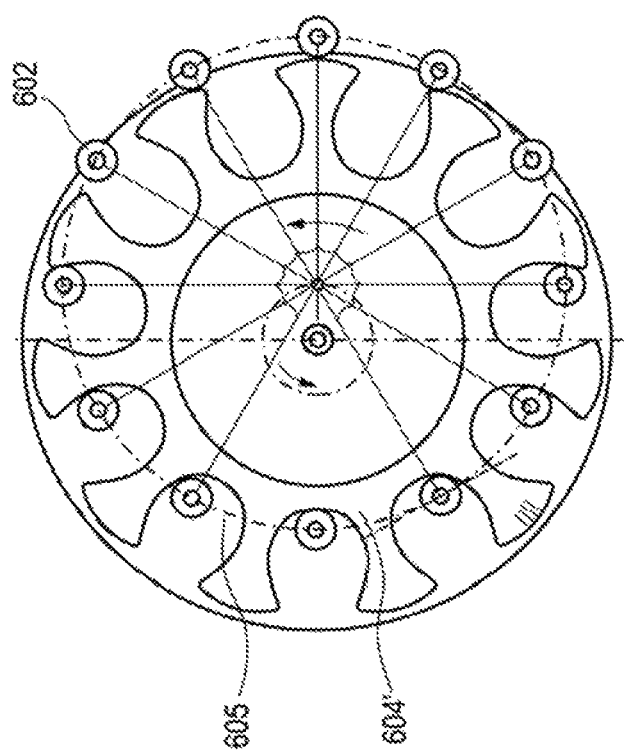
Figure 9:
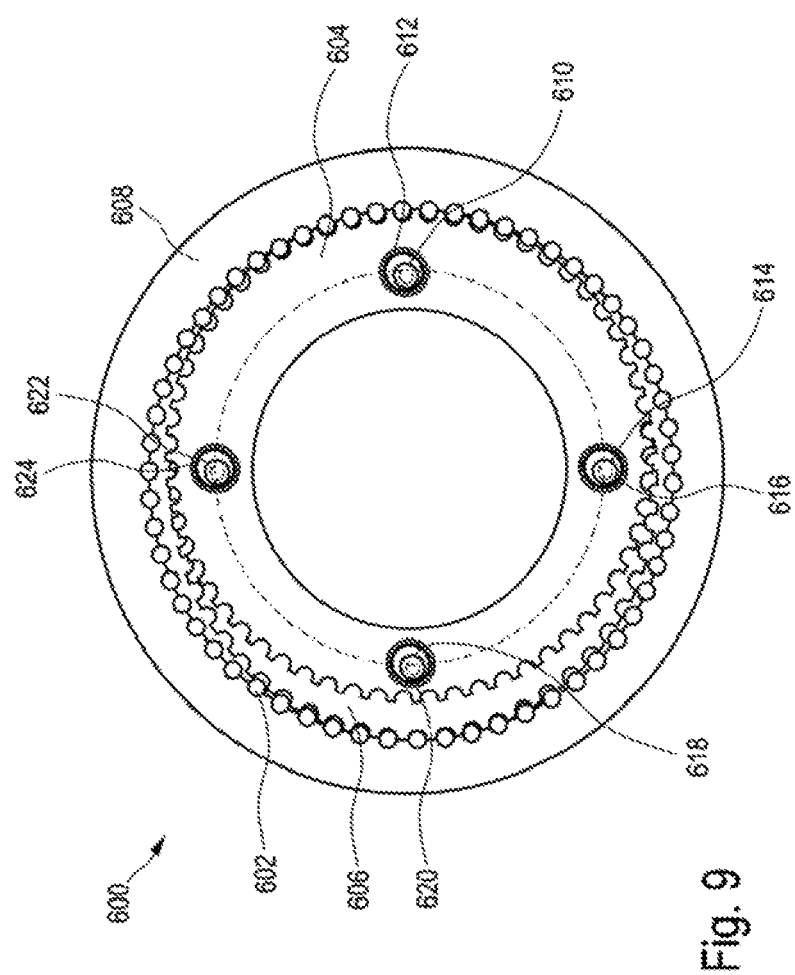
FIG. 9: shows a diagrammatic, two-dimensional view of one exemplary embodiment of an adjustment unit.

FIG. 8 shows a diagrammatic, two-dimensional view of one exemplary embodiment of a second engagement element 604' with a twisted hypocycloid toothing system. A rolling movement with a twisted hypocycloid shape is produced by way of the rolling of the second engagement element 604' on the bolts 602. A second engagement element 604' of this type might also be used, for example, in an adjustment unit 600 according to FIG. 9. FIG. 9 shows a diagrammatic, two-dimensional view of one exemplary embodiment of an adjustment unit 600 with a first engagement element which has a bolt ring 608 and bolts 602, and two second engagement elements 604, 606 which have an annular geometry. The second engagement elements 604, 606 in each case have cam sections on the outer circumference. Furthermore, the engagement elements 604, 606 in each case have four passage openings, in which an eccentric shaft 610, 614, 618, 622 is mounted rotatably in each case by means of a bearing 612, 616, 620, 624.

Figure 10:
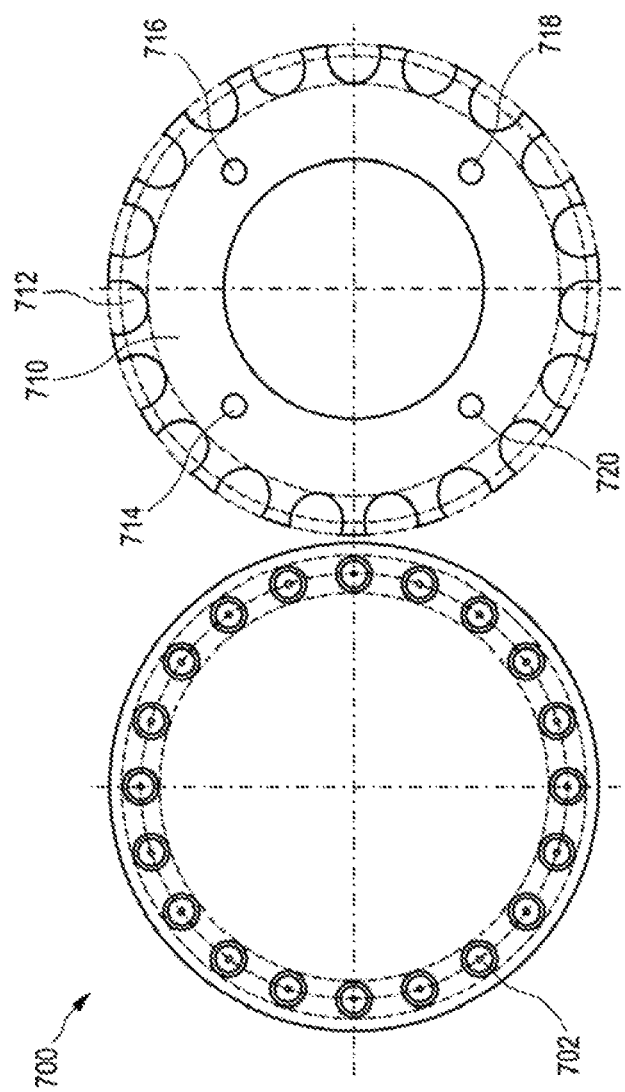
FIG. 10: shows a diagrammatic, two-dimensional view of one exemplary embodiment of a bolt ring and a cam disk.

FIG. 10 shows a diagrammatic, two-dimensional view of a further exemplary embodiment of a bolt ring 700 and a cam disk 710, the bolt ring having a plurality of rotatably mounted bolts 702. On the outer circumference, the cam disk 710 has a plurality of recesses 712. Furthermore, the cam disk 710 has a first, a second, a third and a fourth eccentric shaft opening 714, 716, 718, 720, in which in each case one eccentric shaft can be mounted rotatably.

A particularly wear-free transmission can take place in large components by way of the adjustment unit according to the invention, in particular for an azimuth adjustment and/or a pitch adjustment, by way of the arrangement of cam elements and corresponding bolts. In particular, this arrangement results in an extremely wear-free arrangement, and, moreover, this system has high reliability, since the fracture of an elevation between two cam sections does not lead to a failure of the system.

LIST OF DESIGNATIONS

100 Wind turbine
102 Tower
104 Nacelle
106 Rotor
108 Rotor blades
110 Spinner
200 Pitch adjustment apparatus
202, 302 Adjustment unit
210 Hub adapter
212 Bearing
214 First connecting flange
215, 311 First flange
220 Rotor blade adapter
224 Second connecting flange
230 First drive unit
232 First motor
234 First transmission
236 Transmission housing
240 Second drive unit
242 Second motor
244 Second transmission
250 Third drive unit
252 Third motor
260 Fourth drive unit
262 Fourth motor
264 Fourth transmission
270, 370 Synchronizing element
272, 350, 450 First cam element
274, 360, 460 Second cam element
300, 400 Azimuth adjustment apparatus
310 Motor casing adapter
312 Upper flange opening
314 Lower flange opening
315 Anti-friction bearing
316 Anti-friction bearing outer ring
318 Anti-friction bearing inner ring
320 Tower adapter
330 Drive unit
332 Motor
334 Transmission
340 Eccentric shaft
342 First eccentric shaft section
344 Second eccentric shaft section
352 First cam element opening
354 First eccentric shaft bearing
362 Second cam element opening
364 Second eccentric shaft bearing
380 Bolt ring
382, 482 Bolt
452 Radial outer circumferential face
454 Concave cam section
500 Cam disk mechanism
502 Needle bearing
504 Bolt
506 Output shaft
508 Bearing
510 Eccentric shaft
512 First engagement element
514 Second engagement element
516 Bolt ring
600 Adjustment unit 602 Bolt
604, 604' Second engagement element
605 Hypocycloid recess
606 Second engagement element
608 Bolt ring
610 Eccentric shaft
612 Bearing
614 Eccentric shaft
616 Bearing
618 Eccentric shaft
620 Bearing
622 Eccentric shaft
624 Bearing
700 Bolt ring
702 Bolt
710 Cam disk
712 Recess
714 First eccentric shaft opening
716 Second eccentric shaft opening
718 Third eccentric shaft opening
720 Fourth eccentric shaft opening
D Passage direction
R Rotational axis

The invention claimed is:

1. An adjustment unit for at least one of: an azimuth adjustment or for a pitch adjustment of a wind turbine, comprising:
a drive unit configured to be arranged on a first annular flange, the drive unit having an eccentric shaft;
a plurality of first engagement elements arranged adjacently with respect to one another and at a circumference of a second annular flange, the second annular flange being rotatable with respect to the first annular flange;
a plurality of concave and convex first cam sections arranged on circumferential faces of the plurality of first engagement elements; and
a plurality of second engagement elements adjacently with respect to one another and having concave and convex second cam sections arranged on circumferential faces of the plurality of second engagement elements and corresponding to the first cam sections,
wherein the eccentric shaft is arranged rotatably relative to the plurality of second engagement elements and is at an eccentric point of the plurality of second engagement elements, and
wherein the plurality of first and second engagement elements are arranged and configured to carry out rolling movements between the first cam sections and the second cam sections, and
wherein the plurality of first engagement elements and the plurality of second engagement elements have passage axes arranged in parallel, wherein said passage axes are oriented parallel to a rotational axis of the eccentric shaft.

2. The adjustment unit as claimed in claim 1, wherein:
the adjustment unit is configured as a pitch adjustment unit, and wherein:
the first annular flange is configured as a hub flange, and the second annular flange is configured as a rotor blade flange, or
the first annular flange is configured as the rotor blade flange, and the second annular flange is configured as the hub flange, or
the adjustment unit is configured as an azimuth adjustment unit, and wherein:
the first annular flange is configured as a motor casing flange, and the second annular flange is configured as a tower flange, or
the first annular flange is configured as the tower flange, and the second annular flange is configured as the motor casing flange.

3. The adjustment unit as claimed in claim 1, wherein:
the second cam sections are arranged on an outer circumferential face of the plurality of second engagement elements,
the first cam sections are arranged on an inner circumferential face of the plurality of first engagement elements, and
a quantity of convex first cam sections of the plurality of first engagement elements exceeds a quantity of concave second cam sections of the plurality of second engagement elements by at least one.

4. The adjustment unit as claimed in claim 1, comprising two or more drive units.

5. The adjustment unit as claimed in claim 1, wherein the drive unit comprises at least one of: a motor, a transmission, or a brake.

6. The adjustment unit as claimed in claim 4, wherein the two or more drive units are coupled to a synchronizing element.

7. The adjustment unit as claimed in claim 1, wherein at least one of: the plurality of first engagement elements, the first cam sections, the plurality of second engagement elements, or the second cam sections comprises a fiber reinforced epoxy resin composite material.

8. The adjustment unit as claimed in claim 1, wherein at least one of: the plurality of first engagement elements or the plurality of second engagement elements have an annular geometry.

9. The adjustment unit as claimed in claim 1, wherein:
the plurality of first engagement elements have internal diameters that are greater than external diameters of the plurality of second engagement elements, or
the plurality of first engagement elements have external diameters that are smaller than internal diameters of the plurality of second engagement elements.

10. The adjustment unit as claimed in claim 1, wherein the plurality of first engagement elements are configured as bolt rings, and the first cam sections are configured as bolts, the bolts being spaced apart from one another equidistantly in a circumferential direction, wherein the bolts have bolt longitudinal axes and are arranged in such a way that the bolt longitudinal axes are oriented substantially parallel to the rotational axis of the eccentric shaft.

11. An adjustment apparatus for at least one of: an azimuth adjustment or a pitch adjustment of a wind turbine, comprising a first annular flange and a second annular flange arranged rotatably on one another, and the adjustment unit as claimed in claim 1, wherein:
the drive unit is arranged on the first annular flange;
the plurality of first engagement elements are arranged on the circumference of the second annular flange; and
the plurality of second engagement elements are arranged and configured to bring about a relative movement between the first annular flange and the second annular flange in the case of a rotation of the eccentric shaft.

12. A pitch adjustment apparatus for a rotor blade adjustment of a rotor blade of a rotor of a wind turbine, comprising:

a substantially annular hub adapter with an annular hub flange, the hub adapter being configured to be fastened to a hub of the wind turbine or forming a part of the hub;

a substantially annular rotor blade adapter with an annular rotor blade flange, the rotor blade adapter being configured to be fastened to the rotor blade of the wind turbine or forming a part of the rotor blade;

the annular hub flange being arranged and configured to be rotated relative to the annular rotor blade flange;

the adjustment unit as claimed in claim 1;

the hub adapter being arranged substantially coaxially with respect to the rotor blade adapter;

the drive unit being arranged on the annular hub flange; and the plurality of first engagement elements being arranged on the annular rotor blade flange.

13. The pitch adjustment apparatus as claimed in claim 12, wherein the hub adapter is coupled to the rotor blade adapter by a pitch bearing, and wherein the plurality of first engagement elements are arranged on a circumferential face of the pitch bearing.

14. An azimuth adjustment apparatus for tracking a wind direction with a motor casing of a wind turbine, comprising:
    a substantially annular motor casing adapter with an annular motor casing flange, the motor casing adapter being configured to be fastened to the motor casing of the wind turbine or to form a part of the motor casing;
    a substantially annular tower adapter with an annular tower flange, the tower adapter being configured to be fastened to a tower of the wind turbine, or to form a part of the tower;
    the motor casing flange being arranged to rotate relative to the tower flange;
    the adjustment unit as claimed in claim 1;
    the tower adapter being arranged substantially coaxially with respect to the motor casing adapter;
    the drive unit being arranged on the annular motor casing flange; and
    the plurality of first engagement elements being arranged on the annular tower flange.

15. The azimuth adjustment apparatus as claimed in claim 14, wherein the motor casing adapter is coupled to the tower adapter by an azimuth bearing, and wherein the plurality of first engagement elements are arranged on a circumferential face of the azimuth bearing.

16. A wind turbine, comprising:
    a wind turbine tower,
    a motor casing,
    a rotor with a hub,
    at least one rotor blade, and
    the adjustment unit as claimed in claim 1.

17. A method for adjusting a rotor blade of a rotor of a wind turbine, comprising:
    actuating the drive unit of the adjustment unit of claim 1 to drive the eccentric shaft and to move the plurality of second engagement elements on a cycloid movement path, and thereby rotate the rotor blade about a longitudinal axis.

18. A method for tracking wind direction with a motor casing of a wind turbine, comprising:
    actuating the drive unit of the adjustment unit of claim 1 to drive the eccentric shaft and to move the plurality of second engagement element on a cycloid movement path, and thereby rotate the motor casing about a longitudinal axis.

19. The adjustment unit as claimed in claim 1, wherein a quantity of concave second cam sections exceeds a quantity of convex first cam sections by at least one.

* * * * *